(12) United States Patent
Hsu

(10) Patent No.: US 9,475,240 B2
(45) Date of Patent: Oct. 25, 2016

(54) MANUFACTURING DEVICE FOR A LIGHT GUIDE PLATE

(71) Applicant: HON HAI PRECISION INDUSTRY CO., LTD., New Taipei (TW)

(72) Inventor: Chia-Ling Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 589 days.

(21) Appl. No.: 13/974,309

(22) Filed: Aug. 23, 2013

(65) Prior Publication Data

US 2014/0363533 A1    Dec. 11, 2014

(30) Foreign Application Priority Data

Jun. 7, 2013   (TW) .............................. 102120367 A

(51) Int. Cl.
| | | |
|---|---|---|
| *B29D 11/00* | (2006.01) | |
| *B29C 43/22* | (2006.01) | |
| *B29C 43/24* | (2006.01) | |
| *B29C 43/46* | (2006.01) | |

(52) U.S. Cl.
CPC ....... *B29D 11/00663* (2013.01); *B29C 43/222* (2013.01); *B29C 43/24* (2013.01); *B29C 2043/463* (2013.01)

(58) Field of Classification Search
CPC .......... B29D 11/00663; B29C 43/222; B29C 43/245; B29C 47/0019; B29C 47/004; B29C 47/0806; B29C 59/04; B29C 59/043; B29C 59/046; B29C 2043/463; B29C 2043/467; B29C 2043/468; B29C 2043/3277; B29C 2059/023; B29L 2011/0075; D21G 1/0006; D21G 1/0253; D21G 1/026; D21G 1/0266; D21G 1/0286; D21G 1/002; D21G 1/004; D21G 1/0013; D21F 3/06; D21F 7/02

See application file for complete search history.

(56) References Cited

U.S. PATENT DOCUMENTS

| | | | | |
|---|---|---|---|---|
| 5,803,969 A | * | 9/1998 | Knop | .................... B05C 1/0826 118/227 |
| 2007/0052118 A1 | * | 3/2007 | Kudo | .................... B29C 43/222 264/1.6 |
| 2010/0109180 A1 | * | 5/2010 | Becker | ................ B29C 47/0021 264/40.1 |
| 2011/0242851 A1 | * | 10/2011 | Landry | ................ G02B 6/0065 362/628 |

FOREIGN PATENT DOCUMENTS

CN          202151913 U   *   2/2012

* cited by examiner

*Primary Examiner* — Yogendra Gupta
*Assistant Examiner* — Ninh Le
(74) *Attorney, Agent, or Firm* — Zhigang Ma

(57) ABSTRACT

A manufacturing device includes a feeder, a first pressing roller, a second pressing roller, a third pressing roller, a transmission assembly, and a driving assembly. The first pressing roller and the second pressing roller cooperatively press a hot melt adhesive from the feeder to obtain a preprocessed light guide plate. A temperature of the second pressing roller is lower than a temperature of the hot melt adhesive. The third pressing roller separates the preprocessed light guide plate from the second pressing roller to obtain a light guide plate. The transmission assembly connects the second pressing roller and the third pressing roller. The driving element is connected to the transmission assembly, and drives the transmission assembly to rotate the third pressing roller around the second pressing roller, and thus adjusting a contact area and a contact time between the light guide plate and the second pressing roller.

11 Claims, 2 Drawing Sheets

MANUFACTURING DEVICE FOR A LIGHT GUIDE PLATE

BACKGROUND

1. Technical Field

The present disclosure relates to a manufacturing device for a light guide plate.

2. Description of Related Art

A light guide plate is manufactured by a roller pressing device having a number of pressing rollers. To form a number of molding patterns on the light guide plate, a temperature of the pressing roller needs to be increased. If the light guide plate is not effectively cooled, it may not be released from the pressing roller and could be wrapped around the pressing roller, thus making it difficult to separate the light guide plate from the rollers.

Therefore, it is desirable to provide a manufacturing device for a light guide plate that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
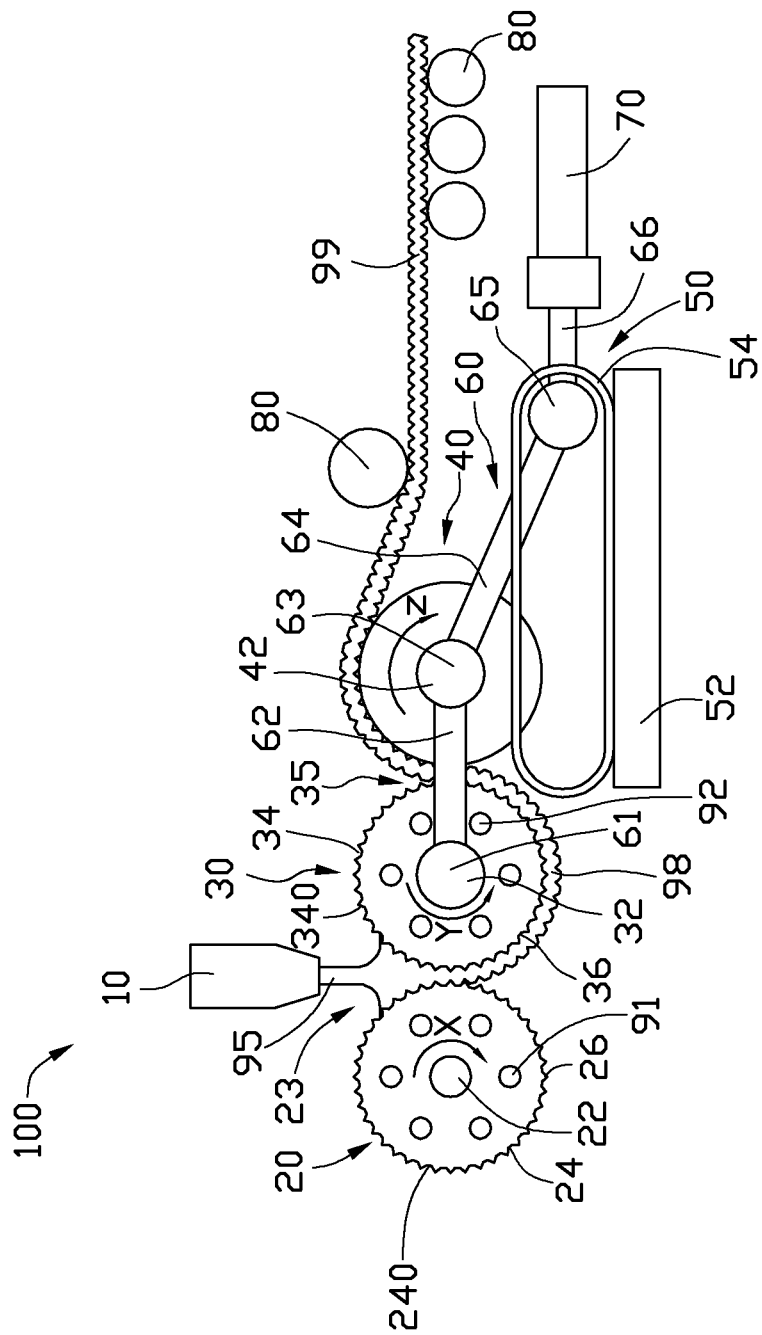
FIG. 1 is a schematic view of a manufacturing device for a light guide plate, according to an exemplary embodiment.
Figure 2:
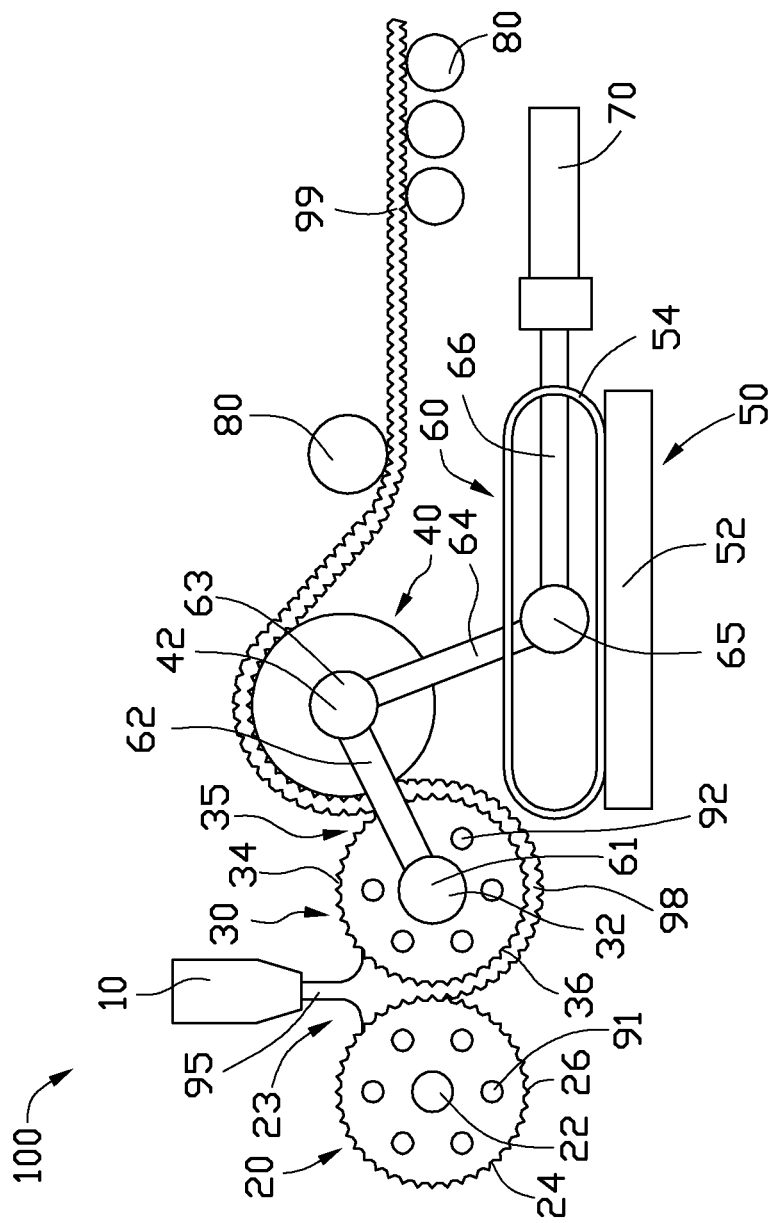
FIG. 2 is a schematic view of the manufacturing device in another working state.

FIG. 1 and FIG. 2 illustrate a manufacturing device 100 for a light guide plate in accordance to an exemplary embodiment. The manufacturing device 100 includes a feeder 10, a first pressing roller 20, a second pressing roller 30, a third pressing roller 40, a guide assembly 50, a transmission assembly 60, a driving element 70, and a number of guiding rollers 80. In this embodiment, the number of the guiding rollers 80 is four.

The feeder 10 is used to provide a hot melt adhesive 95 for forming a light guide plate. The hot melt adhesive 95 can be polymethylmethacrylate (PMMA) or polycarbonate (PC).

The first pressing roller 20 and the second pressing roller 30 are under the feeder 10. The first pressing roller 20 has a first central axis 22 and a first circumferential surface 24. The second pressing roller 30 has a second central axis 32 and a second circumferential surface 34. The first central axis 22 is substantially parallel to the second central axis 32. The first circumferential surface 24 has a number of first molding patterns 240, and the second circumferential surface 34 has a number of second molding patterns 340. In this embodiment, the first molding patterns 240 and the second molding patterns 340 are striped grooves having a V-shaped cross-section. In other embodiments, the first molding patterns 240 and the second molding patterns 340 can be micro-dots, micro domes, or micro striped protrusions.

A molding channel 23 is formed between the first pressing roller 20 and the second pressing roller 30. The hot melt adhesive 95 from the feeder 10 enters the molding channel 23, and thus the first pressing roller 20 and the second pressing roller 30 cooperatively press the hot melt adhesive 95 to form a preprocessed light guide plate 98.

The first pressing roller 20 and the second pressing roller 30 rotate in opposite directions. In this embodiment, the first pressing roller 20 rotates in a clockwise direction (shown as an arrowhead X), and the second pressing roller 30 rotates in a counterclockwise direction (shown as an arrowhead Y).

In this embodiment, the first pressing roller 20 is substantially cylindrical, and defines a number of first through holes 91 for receiving a first liquid for heating the first pressing roller 20, the second pressing roller 30 is substantially cylindrical, and defining a number of second through holes 92 for receiving a second liquid for heating a second pressing roller 30, and thus the temperatures of both the first pressing roller 20 and the second pressing roller 30 are greater than room temperature, and are less than the temperature of the hot melt adhesive 95.

The third pressing roller 40 has a third central axis 42. When the manufacturing device 100 is not working, the first central axis 22, the second central axis 32, and the third central axis 42 are in a same planar surface, and are substantially parallel to each other. The third pressing roller 40 and the first pressing roller 20 are at two opposite sides of the second pressing roller 30. A separating channel 35 is formed between the third pressing roller 40 and the second pressing roller 30.

As the third pressing roller 40 rotates, the preprocessed light guide plate 98 is conveyed along the second circumferential surface 34 to the separating channel 35. The rotating direction of the third pressing roller 40 is opposite to the rotating direction of the second pressing roller 30. In this embodiment, the third pressing roller 30 rotates in a clockwise direction (shown as an arrowhead Z). The third pressing roller 40 is used for separating the preprocessed light guide plate 98 from the second pressing roller 30 to obtain the light guide plate 99.

The guiding assembly 50 is under the third pressing roller 40, and includes a substrate 52 and two guiding rails 54. The two guiding rails 54 are positioned on the substrate 52, and are parallel to each other. Each guide rail 54 is substantially elliptic. The distance between the two guiding rails 54 is greater than a thickness of the third pressing roller 40, and thus the third pressing roller 40 can move into a gap between the two guiding rails 54 when rotating around the second central axis 32.

The transmission assembly 60 includes a first shaft 61, a first connecting pole 62, a second shaft 63, a second connecting pole 64, a third shaft 65, and a third connecting pole 66. The first shaft 61 is mounted to the second central axis 32. The second shaft 63 is mounted to the third central axis 42. The third shaft 65 is slidably clamped between the guiding rails 54. In particular, the two opposite ends of the third shaft 65 are slidably received in the two guiding rails 54, and thus the third shaft 65 can move horizontally along the guiding rails 54. The first connecting pole 62 is connected to the first shaft 61 and the second shaft 63. The first connecting pole 62 can rotate around the first shaft 61, and also can rotate around the second shaft 63. The second connecting pole 64 is connected to the second shaft 63 and the third shaft 65. The second connecting pole 64 can rotate around the second shaft 63, and also can rotate around the third shaft 65. The third connecting pole 66 is connected to the third shaft 65 and the driving element 70. In this embodiment, the third connecting pole 66 is horizontally positioned, and is parallel to the substrate 52.

The driving element 70 is used for driving the third connecting pole 66 to move towards or away from the second pressing roller 30, and thus pushing the third shaft 65 to move towards or away from the second pressing roller 30. The driving element 70 can be a hydro-cylinder or a driving motor.

The guiding rollers 80 are used for guiding a light guide plate 99 from the separating channel 35 to a predetermined position. In other embodiments, the guiding rollers 80 can be omitted, and the light guide plate 99 can be taken up by a take-up reel (not shown).

In use, the first pressing roller 20 and the second pressing roller 30 rotates in opposite directions, then the hot melt adhesive 95 from the feeder 10 flows into the molding channel 23, and the first pressing roller 20 and the second pressing roller 30 cooperatively press the hot melt adhesive 95 to form a preprocessed light guide plate 98. The preprocessed light guide plate 98 has the first micro structures 26 and the second micro structures 36. The first micro structures 26 is coupled with the first molding patterns 240, and the second micro structures 36 is coupled with the second molding patterns 340.

The preprocessed light guide plate 98 is conveyed along the second circumferential surface 34 of the second pressing roller 30, and exchanges heat with the second pressing roller 30 to cool the preprocessed light guide plate 98. The driving element 70 drives the third connecting pole 66 to move towards the second pressing roller 30, and thus pushing the third shaft 65 to move along the guiding rails 54 towards the second pressing roller 30. Such that, the second connecting pole 64 pushes the second shaft 63 to drive the third pressing roller 40 to rotate around the second central axis 32 to increase a contact period and a contact area between the preprocessed light guide plate 98 and the second circumferential surface 34, therefore, the preprocessed light guide plate 98 can be fully cooled. The third pressing roller 40 rotates around the third central shaft 42 to separate the cooled preprocessed light guide plate 98 from the second pressing roller 30, and the light guide plate 99 is obtained. Lastly, the guiding rollers 80 guide the light guide plate 99 to the predetermined position from the separating channel 35.

By employing the manufacturing device 100, the preprocessed light guide plate 98 can be effectively cooled, so the light guide plate 99 will not be wrapped around the pressing roller, and is easily separated from the second pressing roller 30 and the third pressing roller 40. Therefore, the quality of the light guide plate 99 will be effectively improved.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A manufacturing device for a light guide plate, comprising:
   a feeder for providing a hot melt adhesive;
   a first pressing roller;
   a second pressing roller, and the first pressing roller and the second pressing roller cooperatively pressing the hot melt adhesive to form a preprocessed light guide plate, wherein a temperature of the first pressing roller and a temperature of the second pressing roller are lower than a temperature of the hot melt adhesive;
   a third pressing roller configured for separating the preprocessed light guide plate from the second pressing roller to obtain a light guide plate;
   a transmission assembly connecting the second pressing roller and the third pressing roller;
   a driving element connected to the transmission assembly, and configured for driving the transmission assembly to rotate the third pressing roller around the second pressing roller, and thus adjusting a contacting area and a contacting period between the light guide plate and the second pressing roller to cool the light guide plate; and
   a guiding assembly;
   wherein the first pressing roller has a first central axis, the first pressing roller being capable of rotating around the first central axis, the second pressing roller has a second central axis, the second pressing roller being capable of rotating around the second central axis, the third pressing roller has a third central axis, and the third pressing roller is capable of rotating around the third central axis, the first central axis, the second central axis, and the third central axis are parallel to each other, the guiding assembly comprises a substrate and two guiding rails positioned on the substrate, the transmission assembly comprises a first shaft, a second shaft, a third shaft, a first connecting pole, a second connecting pole, and a third connecting pole, the first shaft is fixed to the second central axis, the second shaft is fixed to the third central axis, two opposite ends of the third shaft are slidably received in the two guiding rails, the first connecting pole is directly connected to the first shaft and the second shaft, the second connecting pole directly connects the second shaft and the third shaft, the third connecting pole connects the third shaft and the driving element, the driving element is configured for driving the third connecting pole to push the third shaft slide along the guiding rails, the second connecting pole is configured for pushing the second shaft to drive the third pressing roller to rotate around the second central axis of the second pressing roller.

2. The manufacturing device of claim 1, wherein a molding channel is formed between the first pressing roller and the second pressing roller, the hot melt adhesive from the feeder enters the molding channel to be pressed by the first pressing roller and the second pressing roller.

3. The manufacturing device of claim 2, wherein the first pressing roller has a first circumferential surface, the second pressing roller has a second circumferential surface, the hot melt adhesive is pressed by the first circumferential surface and the second circumferential surface.

4. The manufacturing device of claim 1, wherein a separating channel is formed between the second pressing roller and the third pressing roller, the second pressing roller is configured for guiding the preprocessed light guide plate to the separating channel.

5. The manufacturing device of claim 3, wherein the first circumferential surface has a plurality of first molding patterns, and the light guide plate has a plurality of first micro structures coupled with the first molding patterns.

6. The manufacturing device of claim 5, wherein the second circumferential surface has a plurality of second molding patterns, and the light guide plate has a plurality of second micro structures coupled with the second molding patterns.

7. The manufacturing device of claim 6, wherein each of the first molding patterns is a striped protrusion having a V-shaped cross-section, and each of the second molding patterns is a striped protrusion having a V-shaped cross-section.

8. The manufacturing device of claim 1, wherein the first pressing roller is substantially cylindrical, and defines a plurality of first through holes for receiving a first liquid for heating the first pressing roller to be a predetermined temperature which is greater than a room temperature and is less than the temperature of the hot melt adhesive.

9. The manufacturing device of claim 8, wherein the second pressing roller is substantially cylindrical, and defines a plurality of second through holes for receiving a second liquid for heating the second roller to be a predetermined temperature which is greater than room temperature and is less than the temperature of the hot melt adhesive.

10. The manufacturing device of claim 1, further comprising a plurality of guiding rollers configured for guiding the light guide plate to a predetermined position from the separating channel.

11. The manufacturing device of claim 1, wherein the driving element is a hydro-cylinder or a driving motor.

* * * * *